FIG. I.

May 26, 1953      H. ALLEN      2,639,612
DIFFERENTIAL TENSIOMETER

Filed May 29, 1947      3 Sheets-Sheet 2

HERBERT ALLEN INVENTOR.

May 26, 1953
H. ALLEN
2,639,612
DIFFERENTIAL TENSIOMETER
Filed May 29, 1947
3 Sheets-Sheet 3
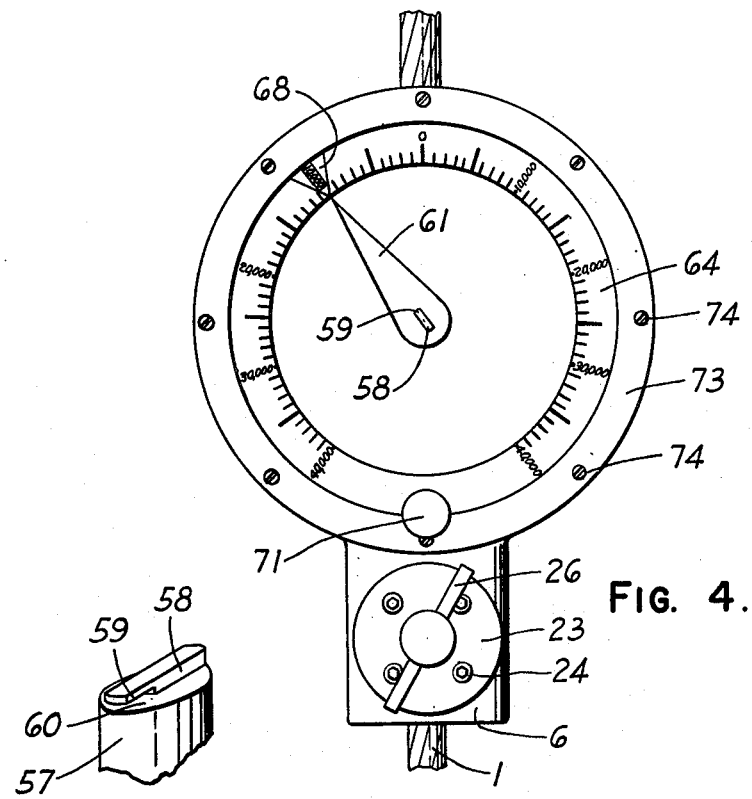
FIG. 4.
FIG. 5.
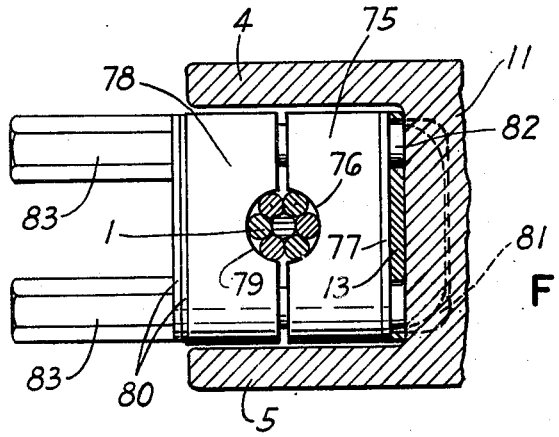
FIG. 3.
HERBERT ALLEN *INVENTOR.*
BY *J. Vincent Martin*
*Ralph K. Browning.*
*James B. Simms.*
*Attorneys.*

Patented May 26, 1953

2,639,612

UNITED STATES PATENT OFFICE 2,639,612

DIFFERENTIAL TENSIOMETER

Herbert Allen, Houston, Tex., assignor to Cameron Iron Works, Houston, Tex., a corporation of Texas Application May 29, 1947, Serial No. 751,412

4 Claims. (Cl. 73—144)

This invention relates to tensiometers and has for its general object the provision of an instrument which will give a direct reading of the amounts of variations from a given initial tension on a flexible line.

This invention is particularly adapted for the purpose of providing a direct reading, at the ground surface, of the weight with which a drill bit is bearing on the bottom of a bore hole in an earth drilling operation. It is the usual practice in such operations to provide a tensiometer for indicating or reading directly the total weight of the drill pipe, drill collar and drill bit suspended by the hoisting apparatus or draw works of the drilling rig. Such conventional tensiometers or weight indicators operate upon the principle of positioning an elastic member such as a spring in such a manner as to produce a predetermined deflection or a lateral displacement of a portion of the anchor cable or dead line of the draw works, coupled with an indicating mechanism for indicating the amount that this dead line straightens out when a load is placed upon it. However, it is desirable to provide an indication or direct reading of the amount of weight with which the bit is allowed to bear on the bottom of the bore hole, and this cannot be done by the simple expedient of adjusting the pointer of a conventional indicator to a zero position on the dial after the entire weight of drill pipe, drill collar and drill bit are suspended from the draw works, because the straightening effect of a given weight increment on the dead line is different for different total weights.

It is, therefore, a more specific object of this invention to provide a tensiometer which will give a direct and satisfactorily accurate reading at the ground surface of the tension on a cable used to suspend a drill bit in a well thereby showing the weight with which the drill bit is bearing on the bottom of the bore hole.

A further object is to provide a structure in which there is provided a subtantially frictionless pivot for one of three misaligned abutments for a cable so that there will be reduced the errors in indicating such weight.

A further object is to provide such a structure with means for adjusting it for use in systems with different mechanical advantages in combination with means for limiting movement of the spring plate hinge providing said pivot to be within a predetermined range whereby excessive fluctuations of cable tension do not injure the hinge.

Other objects and advantages of this invention will become apparent from the following description taken in connection with the accompanying drawings wherein is set forth by way of illustration and example but not by way of limitation, one embodiment of the invention:

In the drawings:

Fig. 3 is a fragmentary cross section taken along the line 3—3 of Fig. 2 and showing one of the line or cable engaging members;

Fig. 4 is a front elevation of the instrument illustrated in Figs. 1 and 2 with the pointer and dial in place thereon; and Fig. 5 is a fragmentary perspective showing the fastening device whereby the pointer is secured to its hub.

Figure 1:
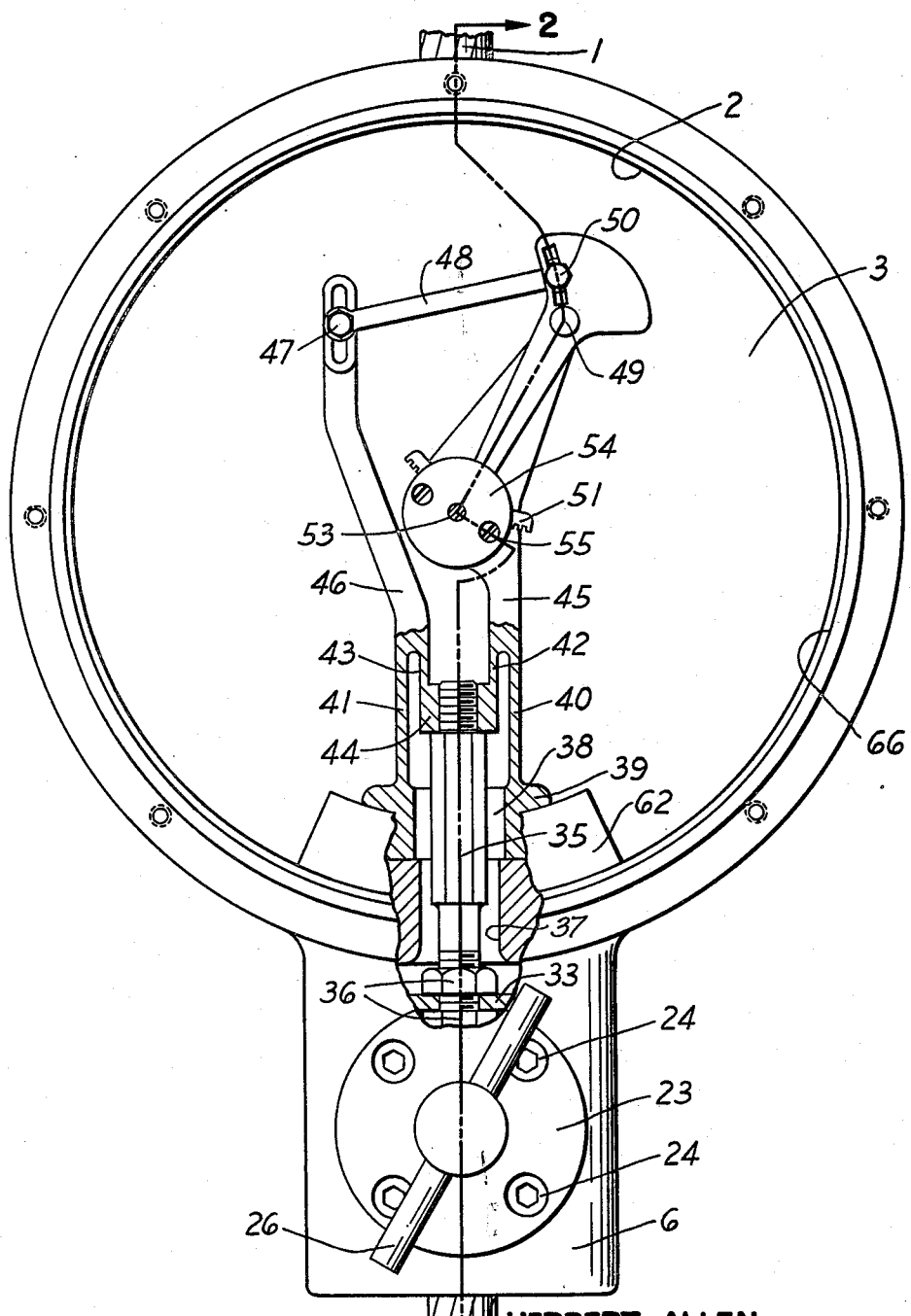
Fig. 1 is a front elevation of a tensiometer constructed in accordance with this invention but with the dial and pointer thereof removed and parts broken away and shown in cross section to illustrate certain of the inner mechanism.

The tensiometer illustrated in the drawings is adapted to be mounted on the dead line or cable 1, the tension in which is to control the operation of the instrument and be indicated on the dial thereof.

The tensiometer structure has as its basis a frame, one portion, 2, of which is made of cylindrical form to receive the dial and certain parts of the indicating mechanism as will be hereinafter described. The main portion of the frame consists of a channel formed with a web 3 which is likewise the back surface of the cylindrical portion 2, and the flanges 4 and 5 which extend rearwardly from the web 3. This channel shaped portion of the frame extends downwardly below the cylindrical part as indicated by the numeral 6. The upper end of this channel shaped portion is partially closed by means of a wall 7 which is notched at 8 to receive a portion of the cable 1 which in turn passes longitudinally through the channel shaped part of the frame.

Extending between the flanges 4 and 5 adjacent their upper ends and just below the notch 8 is a cable or line engaging member in the form of a roller 9 mounted on a pin or a shaft 10 which extends between the webs 4 and 5 and is fixedly secure thereto.

Intermediate the ends of the channel the bottom or web of the same is thickened to provide the heavy portion 11 to which is secured by means of screws 12 or the like a flexible member 13. This member 13 extends below the thickened portion 11 as shown at 14 and has a pair of spaced flanges extending rearwardly from each of its edges as shown at 15 to provide a short channel shaped section with the shaft 16 carried between the flanges 15. Rotatably mounted on the shaft 16 is a line engaging member in the form of a roller 17. Due to the flexibility of the element 13 the line engaging member 17 is movable with respect to the frame so that it may be moved to engage and deflect laterally a particular portion of the cable 1, and so that it may be moved by straightening of the cable as a load is placed thereon.

The web like lower extension 14 is provided with a riveted-in or otherwise secured guide member or dowel 18 adapted to receive one end of the spring or other elastic element 19 by which the movable line engaging member 17 may be urged into such position as to deflect laterally a portion of the line. It is to be noted that while the element 19 has been referred to as an elastic member, this element need not take the exact form illustrated but may be any suitable well-known form of device which will be yieldable under increases and proportionately recoverable upon decreases in loads imposed upon it, and the term "elastic" as herein used is intended to include any such device.

The opposite end of the spring 19 or the like is anchored by or mounted upon an abutment or anchor 20. This mounting in the present instance is illustrated as having a hollow projection 21 extending into and serving as a guide or dowel for maintaining in position the end of the spring 19. The interior of this projection is threaded to receive a stem 22 which is rotatably carried in the detachable bearing element 23, this element being in turn secured to the frame by means of screws 24 or the like. The stem 22 is prevented from moving endwise outwardly with respect to the mounting plate 23 by means of a flange 25 formed integral with the stem. The stem is adapted to be rotated by means of a handle 26 upon its outer end.

It will be seen that by rotation of the handle 26 that end of the spring 19 which is most remote from the line engaging element 17 may be adjusted toward and away from the line engaging element so as to apply a force to the line engaging element and adjust the position of the line engaging element to an arbitrarily selected zero position. Thus, by adjustment of the handle 26 it is possible, with any given load on the line or cable 1, to move the line engaging element 17 to any arbitrarily selected predetermined zero position, thereby producing a standard initial deflection of the cable 1 without regard to the amount of initial tension in the cable.

Figure 2:
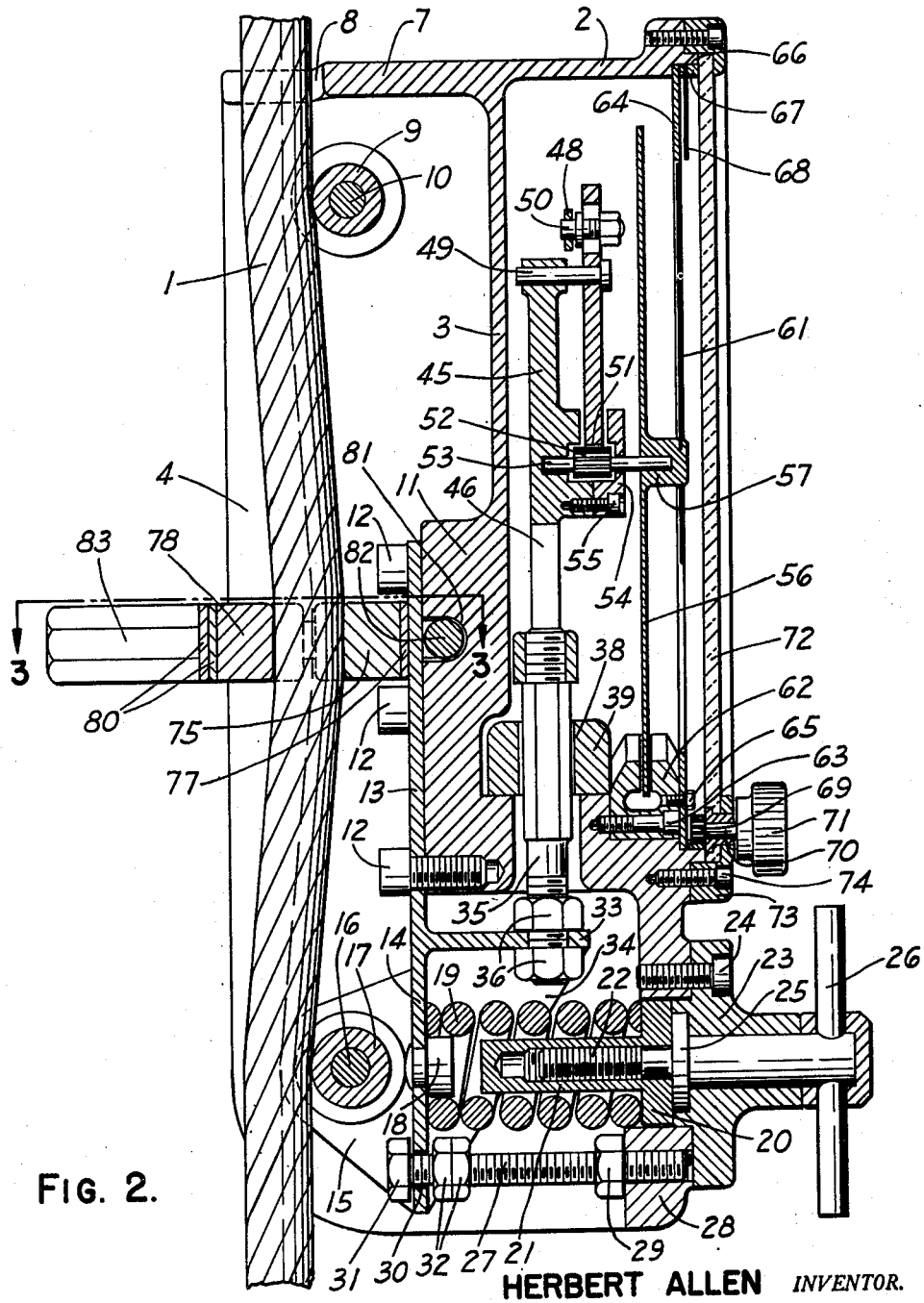
Fig. 2 shows a cross section of the structure illustrated in Fig. 1, taken along the line 2—2 of Fig. 1.

In order to limit the movement of the lower portion of the flexible member 13 which is of relatively weak construction as compared with the spring 19, and thus prevent its injury due to excessive movement, there is provided a bolt or screw 27 threadedly engaging the frame at 28 and locked in place in such threaded engagement by a nut 29. This bolt is positioned so that it extends through an opening 30 in the flexible member 13 and the head 31 of the bolt limits movement of this flexible member to the left as the same is seen in Fig. 2 of the drawings whereas the two nuts 32 which are locked together in suitably adjusted position on the screw 27 serve as a stop to prevent excessive movement of the lower end of the flexible member 13 to the right as the same is seen in Fig. 2.

Between the point at which the spring 19 and the line engaging member 17 are mounted on the flexible member 13, and the portion of this member which is secured to the frame portion 11, this member 13 has formed integral with it a laterally extending part 33 and this part 33 is joined to the lower portion 14 by means of webs 34, thereby insuring that substantially all of the flexing of the member 13 will take place between the lower end of the thickened section 11 of the frame and the laterally extending arm 33. Thus, as the line engaging member 17 is moved to the left or the right as seen in Fig. 2, the laterally extending arm 33 will be moved upwardly or downwardly in direct proportion to the movement of the member 17.

A post 35 has its lower end portion extending through an opening in the arm 33 and secured therein by means of nuts 36. This post passes upwardly through an opening 37 in the frame into the cylindrical portion 2 of the frame heretofore referred to. At its upper end this post 35 also passes through an opening 38 in the base portion 39 of a flexible indicator element having four substantially upstanding parallel flexible legs 40, 41, 42 and 43 respectively. The legs 42 and 43 are joined together by a section 44 into which the post 35 is threadedly received. The legs 40 and 42 are provided by substantially bifurcating an upwardly extending arm 45 integral therewith, and likewise the flexible legs 41 and 43 are provided by a substantial bifurcation of an upwardly extending arm 46 integral therewith. It will be seen that an upward movement of the post 35 will produce a swinging movement of the arms 45 and 46 so that their upper ends will move away from each other whereas downward movement of the post 35 will cause the upper ends of the arms 45 and 46 to move toward each other.

Pivoted in an adjusted position as at 47 to the upper end of the arm 46 is a link 48. A swinging lever is pivoted at 49 to the upper end of the arm 45. The link 48 is pivoted in an adjusted position as at 50 to the lever carried by the arm 45 and the lower end of this lever is formed with a segmental gear 51 in meshing engagement with a pinion 52 mounted on a short shaft 53. This shaft 53 is carried in a bearing in the arm 45 and in a second bearing in the bracket 54 secured by means of screws 55 to the arm 45.

One end of the shaft 53 extends toward the front of the structure in the open side of the cylindrical portion 2 of the frame and received on this end and keyed thereto is a disc 56 having a hub 57. Referring to Fig. 5 it will be seen that on the outer end of this hub 57 is formed an elongated lug 58 having an overhanging end portion 59 leaving between it and the end of the lug a space 60. The pointer 61 is formed with a slot therein adapted to receive the lug 58 and be held in place by the overhanging portion 59 thereof. The slot in the pointer 61 is of a length only slightly greater than the non-undercut portion of the lug 58. The pointer 61, being made of a spring like material, must be bent to enter the space 60 and when fully engaged with the space 60 the opposite end of the slot will snap down over the opposite end of the lug and maintain the engagement of the pointer in the space 60.

The disc 56 is made of a suitable metal or other electrical conductor and a part of its circumference is disposed between the poles of a permanent magnet 62 which is secured by means of screws 63 to the frame.

In substantially the same plane as the pointer 61 and surrounding the path of movement of the outer end of the pointer is a dial in the form of an annular member 64 having suitable indicia formed thereon as shown in Fig. 4. This dial is prevented from rotation with respect to the frame by means of screws 65 which secure it to the permanent magnet 62. The outer periphery of the dial is carried in the countersink 66, together with a ring 67 having internal gear teeth thereon throughout at least a portion of its inner periphery, and having a pointer 68 thereon extending inwardly from the ring at a suitable location. This pointer 68 may be of transparent or translucent material so that the markings on the dial 64 will show through it, or it may have an opening therein so that the numerals on the dial 64 may be seen through the pointer if the pointer is of opaque material.

The internal gear teeth on the ring 67 are engaged by a pinion 69 on the inner end of a short shaft 70, the outer end of which carries a knob 71 by which the shaft may be rotated. A suitable transparent cover such as glass 72 may be disposed over the open end of the cylindrical portion 2 of the frame and held in place by a suitable ring 73 secured to the frame by screws 74. The shaft 70 is provided with a bearing carried by the ring 73 so that upon rotation of the knob 71 the ring 67 carrying the pointer 68 may be adjusted to any desired position.

It is to be noted furthermore that the pointer 68 may be made of a distinctive color so as to readily catch the eye and this color may if desired be the color of the pointer 61.

The cable 1, intermediate the line engaging members 9 and 17, is engaged by a block 75 having a notch 76 to receive the cable. This block 75 may be disposed either directly against the flexible member 13 or suitable shims 77 may be placed between them to adjust the position of the cable 1 with respect to the frame so that variations in the mechanical advantage of the load exerted on the cable will be compensated for. In the case of a drilling rig for drilling wells, the mechanical advantage to be compensated for is determined by the number of lines between the crown block and the travelling block. The shims in such case will preferably each be of such thickness that moving one shim from the position 77 to the position 80 will compensate for the addition of two lines between the crown and travelling block, and vice versa. The cable is held against the block 75 by means of block 78 likewise having a notch 79 to receive the cable. The two notches 76 and 79 are preferably shallow enough so that the two blocks 75 and 78 cannot be brought entirely together with the cable between them. Shims 80 may if desired be placed on the outer surface of the block 78.

The flexible element 13 and the thickened portion 11 of the frame are provided with a channel 81 adapted to receive the U-bolt 82 that passes outwardly through suitable openings in the blocks 75 and 78 and has its projecting ends engaged by suitable nuts 83. The nuts 83 when tightened will serve to clamp the cable 1 between the blocks 78 and 75 and to clamp the block 75 tightly against the flexible element 13. It will be seen that the positioning of the shims 77 and 80 will determine the exact location of this central portion of the cable, but that once clamped, this portion of the cable and the block 75 which forms a line engaging member will be fixed with respect to the frame.

In operation, a suitable deflection of the cable 1 by the line engaging member 17 will cause the pointer 61 to be positioned on the zero mark of the dial 64. After the entire weight of drill pipe, drill collar and drill bit to be employed in the drilling operation has been suspended by the draw works of which the cable 1 forms a part, the cable will have straightened out somewhat and the pointer will indicate a position other than zero on the dial. Then the handle 26 will be turned to adjust the position of the end of the spring 19 which is nearest the frame until this spring bears the line engaging member 17 outwardly a sufficient amount to move the pointer 61 back to the zero mark on the dial. At this point the deflection of the cable or line will stand at the original arbitrarily selected zero position. Then if it be desired to place say 10,000 pounds of weight on the bottom of the hole by contact of the drill therewith, the draw works will be slacked off until the pointer 61 indicates 10,000 pounds on the dial 64. In order to enable the driller more readily to keep the pointer 61 at this point, the knob 71 may be rotated until the pointer 68 coincides with the 10,000 pound mark on the dial. Thereupon the driller will begin his drilling operation easing off or taking up on the draw works as necessary to maintain the pointer 61 coincident with the pointer 68. As long as this is done, he will be sure with reasonable degree of accuracy of maintaining the desired 10,000 pounds of weight on the bottom of the hole. The weight to be maintained on the bottom of the hole will be selected by the driller with a view to causing the drill bit to drill most efficiently in the formation which happens to exist at the bottom of the hole.

Now let it be assumed that the drilling has continued until it becomes necessary to add at the upper end of the drill stem an additional section of drill pipe. The additional section is screwed on to the upper end of the drill stem and then the entire drill stem including the added section of drill pipe will be suspended from the draw works. Naturally since added weight is suspended, the pointer 61 will swing from zero in a direction opposite that in which it moved from zero when weight was slacked off on the bottom of the well, and will swing an amount corresponding to the weight of the added section of pipe. The handle 26 will then be adjusted so as to move the cable deflector which includes the line engaging member 17 back to the original arbitrarily selected zero point, after which the pointer 61 will again register zero on the dial 64. Thereupon weight is slacked off until the pointer 61 coincides with the pointer 68 and drilling again proceeds as before.

It will be seen that inasmuch as the zero point is always set with the full weight of the drill pipe on the cable, the deflection of the pointer 61 will always indicate the weight on the bottom of the hole. Furthermore, it will be seen that since when the pointer 61 is at zero on the dial, there is always the same amount of deflection on the cable 1 regardless of the weight suspended by the cable, meaurement of the weight placed on the bottom of the hole will start from the same arbitrarily selected deflection of the cable regardless of the weight of the drill stem. The only part of the device which will have a different zero status for each initial weight is the spring 19 or its equivalent. Since this spring 19 has a straight line load deformation characteristic, the amount of its deformation for any zero setting will not affect the accuracy of the instrument in indicating increases or decreases from the zero setting. Hence errors which would be introduced if the measurement began with the cable less deflected at sometimes than at others, will be substantially eliminated.

It will be appreciated that while one of the principal uses of this device is in determining the amount of weight on the bottom of the hole during drilling, it will likewise be useful in determining the amount of pull exerted upon a stuck bit in an effort to release it, and for numerous other purposes in connection with drilling wells. Furthermore, it will be found useful in any location wherein it is desired to indicate or read directly the amount of variation in tension upon a flexible line as distinguished from the total tension thereon.

Having described my invention, I claim:

1. A load indicator particularly adapted to measure changes in the tension of tool supporting cables in the drilling of a well which comprises, in combination, a rigid frame, a first abutment carried by the frame, a second abutment carried by said frame and spaced from said first abutment and including a releasable clamp adapted to frictionally engage a cable so as to support the indicator thereon, a third abutment spaced from the first and second abutments and out of alignment therewith so that when a cable is brought into engagement with all three abutments and clamped by said clamp a portion of the cable is deflected laterally, a flexible spring plate hinge having one of its ends fixed to the frame and its other end extending from the frame, said third abutment being mounted on said other end of the hinge, the hinge being stiffened along a major part of its length remote from the frame to prevent bending of said part, a spring between the frame and said other end of the plate urging the third abutment into misalignment with the first and second abutments, means for adjusting the urging force of said spring, stop parts carried by the frame, one on each side of said other end of the plate, limiting movement of the other end of the plate to be within a predetermined amount so that the plate hinge is protected from excessive fluctuations in cable tension, an indicating means carried by said frame, and connecting means between said indicating means and said other end of the flexible plate whereby movement of the flexible plate is transmitted to said indicating means.

2. The combination of claim 1 wherein said spring between the frame and the other end of said flexible plate has straight line characteristics whereby, upon attachment of the indicator to a cable under tension, the spring can be adjusted to position said other end of the plate hinge at a position between said stop parts and a given change in cable tension will result in a predetermined extent of plate hinge movement irrespective of the initial cable tension.

3. In a line load variation indicator of the type having a substantially rigid frame having three spaced abutments thereon adapted to receive a line the load upon which is to be measured, said abutments being out of alignment with each other so that when a line is brought into engagement with all three abutments a portion of the line will be deflected laterally, the improvement which resides in the combination therewith of an adjustable mounting for one of the abutments including an elastic system urging the adjustably mounted abutment in a direction to maintain the abutments in misalignment, said system having a flexible spring plate with one end rigidly secured to the frame and with the remaining portion thereof extending from said frame for carrying the adjustably mounted abutment, said remaining portion being stiffened along a major part of its length remote from said frame to prevent bending of such part, thereby providing an anti-friction flexible plate hinge between said stiffened part of said plate and said frame, a rigid arm connected rigidly to the stiffened portion of the spring plate and extending therefrom so as to be rotatable about the flexible portion of the spring plate, a force transmitting post rigidly connected to said arm and extending substantially parallel to said spring plate whereby movement of the adjustably mounted abutment is transmitted in a direction substantially parallel to said spring plate, and an indicator means connected to and responsive to movement of said force transmitting post.

4. In a line load variation indicator of the type having a substantially rigid frame having three spaced abutments thereon adapted to receive a line the load upon which is to be measured, said abutments being out of alignment with each other so that when a line is brought into engagement with all three abutments a portion of the line will be deflected laterally, the improvement which resides in the combination therewith of an adjustable mounting for one of the abutments including an elastic system including a flexible spring plate with one end rigidly secured to the frame and with the remaining portion thereof extending from said frame for carrying the adjustably mounted abutment, said remaining portion being stiffened along a major part of its length remote from said frame to prevent bending of such part and to provide a flexible plate hinge between said stiffened part of said plate and said frame and an adjustable elastic member carried between said frame and said stiffened part of said plate to urge the adjustable abutment into misalignment with the other abutments whereby said elastic member can be adjusted to move said adjustable abutment to the same location when the line load is changed, a rigid arm connected rigidly to the stiffened portion of the spring plate and extending therefrom so as to be rotatable about the flexible portion of the spring plate, a force transmitting post rigidly connected to said arm and extending parallel to said spring plate whereby movement of the adjustably mounted abutment is transmitted in a direction substantially parallel to said spring plate and an indicator means connected to and responsive to the position of said force transmitting post.

HERBERT ALLEN.

References Cited in the file of this patent

UNITED STATES PATENTS

| Number | Name | Date |
|---|---|---|
| 892,021 | Wirsching | June 30, 1908 |
| 1,400,776 | Smith | Dec. 20, 1921 |
| 1,840,039 | Joyce | Jan. 5, 1932 |
| 2,118,727 | Hanes | May 24, 1938 |
| 2,196,099 | Calame | Apr. 2, 1940 |
| 2,285,471 | Sturgess | June 9, 1942 |
| 2,298,216 | Lamberger | Oct. 6, 1942 |
| 2,309,211 | Raphael | Jan. 26, 1943 |
| 2,361,915 | Allen | Nov. 7, 1944 |
| 2,401,576 | Mason | June 4, 1946 |

FOREIGN PATENTS

| Number | Country | Date |
|---|---|---|
| 15,091 | France | Feb. 15, 1912 |
| 130,658 | Great Britain | Aug. 14, 1919 |